United States Patent Office 3,161,682
Patented Dec. 15, 1964

3,161,682
METHOD FOR PREPARING POLYOXYALKYLENE PRIMARY AMINES
Sherman D. Lesesne, Georgetown, and Norman B. Godfrey and Philip H. Moss, Austin, Tex., assignors to Jefferson Chemical Company, Inc., Houston, Tex., a corporation of Delaware
No Drawing. Filed Apr. 28, 1960, Ser. No. 25,187
5 Claims. (Cl. 260—584)

The present invention relates to basic polyether compositions and, in particular, to a method for their preparation. The subject compositions may also be described as primary amine derivatives of polyalkylene glycols.

The basic polyether compositions prepared by the present process comprise a large class of polymeric materials having molecular weights in the range from about 100 up to about 10,000 and above. These compositions may be represented by the formula:

$$NH_2-Z-(oxyalkylene)_x-OH$$

in which Z represents a divalent radical which is an alkylene radical having 2 to 6 carbon atoms, cycloalkylene radical having 4 to 6 carbon atoms and a dialkylene ether radical having 4 to 6 carbon atoms and $x$ represents a number from 2 up to about 200. These materials are useful as detergents, as solvents and as intermediates in the preparation of surface active agents, emulsifiers and corrosion-inhibiting compositions.

A three-step method for preparing the above-noted compositions is the subject of a commonly assigned copending Speranza et al. application Serial No. 860,317, filed December 18, 1959, and entitled "Method for Preparing Basic Polyether Compositions" now U.S. Patent 3,110,732. This three-step method involves the reactions of an alkanolamine with a carbonyl compound to form a condensation product, such as a Schiff base, followed by the reaction of the so-formed condensation product with an alkylene oxide to form a condensation product-alkylene oxide adduct and finally by hydrolysis of the adduct to give a basic polyether composition. An improved method for the formation of basic polyether compositions has now been discovered. This method is more efficient and obviates the need for forming intermediate condensation products as is required by the method previously employed.

In accordance with this invention, oxyalkylation is effected by catalytically reacting an alkanolamine, defined hereinbelow, with an alkylene oxide or 1,2-epoxy compound. An alkaline reacting alkali metal material is employed as the catalyst and high yields of primary amines are realized when a relatively high proportion of the alkaline reacting material is employed in relation to the amount of the alkanolamine feed.

Alkanolamines which can be employed as starting reactants for the preparation of basic polyether compositions are represented by the formula:

$$NH_2-Z-OH$$

in which Z represents a divalent radical which is a straight chain or branched chain alkylene radical having 2 to 6 carbon atoms, a cycloalkylene radical having 4 to 6 carbon atoms or a dialkylene ether radical having 4 to 6 carbon atoms. The dialkylene ether radicals may be represented by the formula:

$$-R-O-R-$$

in which each R represents a hydrocarbon radical having 2 to 3 carbon atoms. Specific alkanolamines which may be employed include monoethanolamine, 1-amino-2-propanol, 2-amino-1-propanol, 3-amino-1-propanol, 1-(2-aminoethoxy)ethanol, 1-amino-2-butanol, 2-amino-3-butanol, 2-amino-2-methylpropanol, 5-amino pentanol, 3-amino-2, 2-dimethyl propanol, 4-aminocyclohexanol and the like.

The above-noted alkanolamines are directly reacted with an alkylene or olefin oxide in this process. Alkylene oxides which may be employed are represented by the formula.

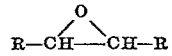

in which R represents hydrogen or a hydrocarbon radical having in the range of 1 to 2 carbon atoms. A single alkylene oxide may be employed or a plurality may be employed either in a mixture or sequentially to obtain a variety of product properties. Suitable olefin oxides include ethylene oxide, propylene oxide, 1,2-butylene oxide, 2,3-butylene oxide and the like.

The catalysts employed are a critical feature of this invention. Suitable catalysts are those which react with the alkanolamine reactant to give anhydrous alkoxides of the formula:

$$NH_2-Z-O^-M^+$$

where Z has the values noted above and M is an alkali metal. In general, the catalysts are the strongly alkaline reacting alkali metals and compounds of the alkali metals. Suitable catalysts are sodium, sodium hydride, sodium amide, sodium hydroxide, sodium alkoxides, such as sodium methoxide and sodium ethoxide and the corresponding potassium and lithium compounds. Water and alcohol formed respectively when a hydroxide or alkoxide catalyst is used must be removed before the condensation product and catalyst mixture is subject to oxyalkylation.

Another important feature of this process is the proportion of the alkaline reacting material employed in proportion to the alkanolamine reactant. Experiments have been conducted in which ethylene oxide and an amino alcohol were reacted at 100° C. in the presence of varying proportions of sodium as the alkaline reacting material. At a molar ratio of sodium to amino alcohol of 0.65 to 1, the yield of primary amine was 32%. Increasing the molar ratio of the sodium to monoethanolamine to 1 to 1, resulted in a primary amine yield of 51%. At sodium to monoethanolamine ratios of 1.3 to 1, a yield of 75% was obtained. The differences indicate the importance of the amount of the catalyst in this process. In general, alkaline reacting material to alkanolamine molar ratios in the range from 0.5:1 up to about 2:1 may be effectively employed with sharply increased yields being obtained with amounts in the range from 1:1 to about 1.5:1.

Direct oxyalkylation of an alkanolamine by the instant process may be carried out over a broad range of temperatures. This is illustrated by the following runs conducted at various temperatures in which an amino alcohol and ethylene oxide were reacted in the presence of sodium. The molar ratio of sodium to amino alcohol was held at 1.5 to 1 during these experiments. The first run, which was carried out in the manner described and at a temperature of 40° C., resulted in the production of 4% of a primary amine. A second experiment conducted at 65° C., resulted in a 58% yield of a primary amine. In a run at 100° C., the yield of primary amine was 77% and a run at 150° C. resulted in a primary amine yield of 88%. This process may be effectively conducted at temperatures in a range from about 50° C. to about 200° C., with surprisingly improved yields being obtained at temperatures in the range from 100° to about 150° C.

The instant reaction may be conducted at atmospheric pressure although it is desirable to employ moderate pressures to increase the rate of reaction between the alkylene oxide and the alkanolamine. Pressures ranging from about atmospheric up to about 100 p.s.i.g. (pound per square inch gauge) are convenient although higher pressures are also effective.

The following examples illustrate the practice of this invention:

Example I 12 grams of monoethanolamine (0.2 mol), 7.0 grams of sodium (0.3 mol), and 100 grams of diethylene glycol dimethyl ether (used as a solvent) were placed in an autoclave. The vessel was evacuated, flushed with nitrogen and stirred for four hours at 150° C. The gas pressure created in starting up was released and 184 grams of ethylene oxide reacted with the monoethanolamine at 150° C. and 20 p.s.i.g. over a period of 2 hours.

The product was diluted with 250 ml. of water and hydrochloric acid added to being the pH down to 11.0. Water and solvent were removed by distillation followed by stripping at 165° C. under vacuum. Sodium chloride precipitated as a result of this treatment and this was removed by filtration.

The product was a cream colored solid that melted at 30° to 34° C. The primary amine analysis was 0.898 meq/g. which is equivalent to a yield of 88.2%. The molecular weight was 960 (theory 980).

Example II 12 grams of monoethanolamine (0.2 mol), 8.5 grams of sodium hydride (0.5 mol), and 25 grams of diethylene glycol dimethyl ether (as a solvent) were placed in a one liter-three neck flask in an atmosphere of nitrogen. The flask was equipped with a stirrer and a Dry Ice reflux condenser. This mixture was stirred for 20 minutes at a temperature of 100° C. after which ethylene oxide was added at atmospheric pressure. The reaction temperature was maintained between 90° C. and 105° C. while 180 grams of ethylene oxide was added over a period of 3 hours.

The product was diluted with 250 milliliters of water and the pH brought down to 11.0 by the addition of hydrochloric acid. Water and solvent were removed by distillation followed by a stripping treatment at 165° C. under a vacuum. Sodium chloride, precipitated by the foregoing treatment, was removed by filtration.

The product was a cream colored solid with a molecular weight of 1040 and a melting point of 29° C. Analysis indicated that the yield of primary amine was 64%.

Example III

Monoethanolamine and ethylene oxide were reacted at 100° C. and 40 p.s.i.g. in a manner similar to that described in Example I above. Sodium was employed in the proportion of 25 grams of sodium per mol of monoethanolamine but no solvent was employed. A 51% yield of a primary amine basic polyether composition having a molecular weight of 1075 was obtained.

Example IV

Monoisopropanolamine and sodium hydride were admixed in diethylene glycol dimethyl ether, the sodium hydride being present in the proportion of 42 grams per mol of monoisopropanolamine. This mixture was reacted with ethylene oxide at 100° C. and atmospheric pressure in the manner described in Example I above. A 62% yield of a basic polyether composition having a molecular weight of 990 was obtained.

Obviously, many modifications and variations of the invention, as hereinbefore set forth, may be made without departing from the spirit and scope thereof, and therefore, only such limitations should be imposed as are indicated in the appended claims.

We claim:

1. A method for preparing a basic polyether having the formula:

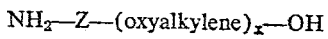

$NH_2$—Z—(oxyalkylene)$_x$—OH which comprises the steps of reacting an alkanolamine having the formula:

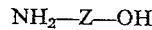

$NH_2$—Z—OH with a strongly alkaline member selected from the group consisting of the metals, hydrides, amides and hydroxides of sodium, potassium and lithium in the molar ratio of said strongly alkaline member to said alkanolamine in the range from about 0.5:1 to about 2:1, and removing any by-product water and by-product alcohol of the reaction to thereby provide a first reaction mixture containing an anhydrous alkali alkoxide, adding to said first reaction mixture from about 2 to about 200 mols per mol of said alkanolamine of an alkylene oxide having the formula:

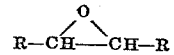

under reaction conditions including a temperature within the range of about 50° to about 200° C. and a pressure within the range of 0 to about 100 p.s.i.g. to form a second reaction mixture containing said basic polyether and recovering said basic polyether from said second reaction mixture, Z in the above formulae being a member selected from the group consisting of $C_2$ to $C_6$ divalent alkylene groups, $C_4$ to $C_6$ cycloalkylene groups and $C_4$ to $C_6$ dialkylene ether groups represented by the formula:

—R'—O—R'— x being a number from 2 up to about 200, R being selected from the group consisting of hydrogen, methyl and ethyl and R' being a hydrocarbon group containing 2 to 3 carbon atoms.

2. A method for preparing a basic polyether composition having the formula:

$NH_2$—Z—(oxyalkylene)$_x$—OH which comprises the steps of reacting an alkanolamine having the formula:

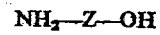

$NH_2$—Z—OH with a strongly alkaline member selected from the group consisting of the metals, hydrides, amides and hydroxides of sodium, potassium and lithium in the molar ratio of said strongly alkaline member to said alkanolamine in the range from about 1:1 to about 1.5:1, and removing any by-product water and by-product alcohol of the reaction to thereby provide a first reaction mixture containing an anhydrous alkali alkoxide, adding to said first reaction mixture from about 2 to 200 mols per mol of said alkanolamine of an alkylene oxide having the formula:

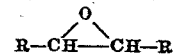

under reaction conditions including a temperature within the range of about 100° to about 150° C. and a pressure within the range of 0 to about 100 p.s.i.g. to form a second reaction mixture containing said basic polyether and recovering said basic polyether from said second reaction mixture, Z in the above formulae being a member selected from the group consisting of $C_2$ to $C_6$ divalent alkylene groups, $C_4$ to $C_6$ cycloalkylene groups and $C_4$ to $C_6$ dialkylene ether groups represented by the formula:

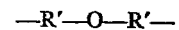

—R'—O—R'— x being a number from 2 up to about 200, R being selected from the group consisting of hydrogen, methyl and ethyl and R' being a hydrocarbon group containing 2 to 3 carbon atoms.

3. A method as in claim 2 wherein the alkanolamine is monoethanolamine.

4. A method as in claim 3 wherein the strongly alkaline member is sodium and the alkylene oxide is ethylene oxide.

5. A method as in claim 3 wherein the strongly alkaline member is sodium hydroxide and the alkylene oxide is ethylene oxide.

References Cited in the file of this patent
UNITED STATES PATENTS

| | | |
|---|---|---|
| 2,674,619 | Lundsted | Apr. 6, 1954 |
| 2,763,529 | Albrecht et al. | Sept. 18, 1956 |
| 2,823,236 | Lowe et al. | Feb. 11, 1958 |
| 2,871,266 | Riley | Jan. 27, 1959 |